US008554285B2

(12) United States Patent
Kim et al.

(10) Patent No.: US 8,554,285 B2
(45) Date of Patent: Oct. 8, 2013

(54) SWING-TYPE PORTABLE TERMINAL (75) Inventors: Won-Tae Kim, Gyeonggi-do (KR);
Sang-Joon Park, Seoul (KR); Pil-Je Cho, Gyeonggi-do (KR); Young-Woo Huh, Gyeonggi-do (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 685 days.

(21) Appl. No.: 12/847,088

(22) Filed: Jul. 30, 2010

(65) Prior Publication Data

US 2011/0041634 A1 Feb. 24, 2011

(30) Foreign Application Priority Data

Aug. 18, 2009 (KR) .................. 10-2009-0076432

(51) Int. Cl.
*H04M 1/00* (2006.01)
(52) U.S. Cl.
USPC .................. 455/575.1; 455/575.3; 455/575.8; 43/166; 43/331
(58) Field of Classification Search
USPC ................ 455/347–349, 550.1, 575.1, 575.4, 455/575.8, 90.3; 403/166, 331; 361/616, 361/667, 724–727, 747, 769; 429/97, 100; 439/500
See application file for complete search history.

(56) References Cited

U.S. PATENT DOCUMENTS

| 8,023,040 | B2 * | 9/2011 | Zhou | 348/376 |
| 8,116,085 | B2 * | 2/2012 | Yeh | 361/752 |
| 8,243,430 | B2 * | 8/2012 | Ahn et al. | 361/679.27 |
| 8,315,041 | B2 * | 11/2012 | Wang | 361/679.01 |
| 2008/0016649 | A1 * | 1/2008 | Lee et al. | 16/307 |
| 2009/0233658 | A1 * | 9/2009 | Murayama et al. | 455/575.3 |
| 2009/0258551 | A1 * | 10/2009 | Nomura et al. | 440/76 |
| 2010/0081489 | A1 * | 4/2010 | Ohba et al. | 455/575.3 |

FOREIGN PATENT DOCUMENTS

KR 2002-43417 7/2002

* cited by examiner

*Primary Examiner* — Dominic E Rego
(74) *Attorney, Agent, or Firm* — Cha & Reiter, LLC.

(57) ABSTRACT

A portable terminal with a pair of housings is provided, in which a fixed member has a through hole and is fixed to one surface of a first housing, the through hole penetrating both surfaces of the fixed member, a rotation member is fixed to one surface of a second housing, facing one surface of the fixed member, a driving member is rotatably engaged with the through hole on the other surface of the fixed member and fixed to the rotation member, and an elastic member has one end supported by the fixed member and the other end supported by the driving member, for providing a driving force to rotate the driving member. The second housing covering the first housing or moving to a position where the second housing is in parallel with the first housing by rotating along with the rotation member and the driving member around a hinge axis extended vertically with respect to the first housing by the driving force of the elastic member.

15 Claims, 10 Drawing Sheets

SWING-TYPE PORTABLE TERMINAL

CLAIM OF PRIORITY

This application claims, pursuant to 35 U.S.C. §119(a), priority to and the benefit of the earlier filing date of, that Korean Patent Application filed in the Korean Intellectual Property Office on Aug. 18, 2009 and assigned Serial No. 10-2009-0076432, the entire disclosure of which is hereby incorporated by reference.

BACKGROUND OF THE INVENTION

1. Field of the Invention

The present invention generally relates to a portable terminal. More particularly, the present invention relates to a swing-type portable terminal in which one housing covering a second housing swings to a position at which the one housing resides faces and is in parallel with the second housing.

2. Description of the Related Art

Portable terminals represent an electronic device that provides typically a wireless communication function among users or between a user and a service provider. The traditional mobile communication service provided through portable terminals was confined to voice call and short message transmission. However, the mobile communication service has expanded its service area to multimedia service such as on-line gaming and Video-on-Demand (VoD) and data services, such as transmission of video files and music files.

Portable terminals are classified into a bar type, a flip type, and a folder type according to their appearance. The bar-type portable terminal has an input device, such as a keypad, and a transmitter and an output device, such as a display, and a receiver in a single housing. The flip-type portable terminal is characterized in that input and output devices are mounted in a single housing and a flip cover is rotatably opened from and closed to the single housing to protect the input device. The folder-type portable terminal includes a pair of housings facing each other that approach or recede from each other by rotation. Since an input device and an output device are appropriately distributed to the housings, the folder-type portable terminal is easy to use and carry. In the folded state their size is further reduced with increases their portability.

In addition to the above-described types of portable terminals, a sliding type, a swing type, a rotary type, and a composite type have emerged to meet various demands of users. The sliding-type portable terminal is opened or closed by a linear movement of a pair of housings facing each other. The rotary-type portable terminal is configured so that the frontal and rear surfaces of a folder type terminal can be reversed in an open state. The composite-type portable terminal realizes a folder-type opening and closing operation and a swing-type opening and closing operation in combination.

Korea Patent Application No. 2002-43417 filed on Jul. 23, 2002 (U.S. patent application Ser. No. 10/287,148, entitled "Mobile Terminal and Hinge Device Thereof," filed on Nov. 4, 2002), and assigned to the assignee of the instant application, discloses a swing-type terminal in which a pair of housings facing each other are rotatably coupled and an associated hinge device. The hinge device for the swing-type portable terminal includes a first hinge base and a second hinge base with a hinge shaft that is extended through a hinge hole formed at the first hinge base. An engagement member such as an E-ring surrounds the outer circumferential surface of the hinge shaft.

A hinge device for the swing-type portable terminal includes a hinge base that is fixed in a housing and has an extended hinge shaft and another hinge base rotatably engaged with the hinge shaft. These hinge bases are maintained engaged by an engagement member like a snap ring or an E-ring.

Generally, a user carries a swing-type portable terminal with its housings overlapped. To uses it, the user opens the housings at 90° or 180° with respect to each other. However, in many cases it is inconvenient to rotate one housing with respect to the other housing to an intended position.

SUMMARY OF THE INVENTION

An aspect of exemplary embodiments of the present invention is to address at least the problems associated with the conventional swing-type portable terminals and to provide at least the advantages described below. Accordingly, an aspect of exemplary embodiments of the present invention is to provide a swing-type portable terminal configured so as to facilitate opening and closing of the terminal housings.

Another aspect of exemplary embodiments of the present invention provides a small-size portable terminal configured so as to facilitate opening and closing of the terminal housings.

A further aspect of exemplary embodiments of the present invention provides a small-size portable terminal configured so as to be stably opened and closed.

In accordance with an aspect of exemplary embodiments of the present invention, there is provided a portable terminal with a first and second housings, in which a member is fixed to the first surface and includes s a through hole penetrating both surfaces of the fixed member, a rotation member fixed to one surface of the second housing, facing one surface of the fixed member, a driving member rotatably engaged with the through hole on the other surface of the fixed member and fixed to the rotation member, and an elastic member having one end supported by the fixed member and the other end supported by the driving member, the elastic member providing a driving force to rotate the driving member, wherein the second housing covers the first housing or moves to a position where the second housing is parallel with the first housing by rotating along with the rotation member and the driving member around a hinge axis, the hinge axis extended vertically with respect to the one surface of the first housing by the driving force of the elastic member.

The elastic member is a torsion spring having a coil, first and second free ends extended from the coil to recede from each other wherein the torsion spring may provide an elastic force in a direction that makes end portions of the free ends recede from each other.

The portable terminal may further include a support protrusion formed at the fixed member, an engagement member engaged with an end portion of the support protrusion, and a support member fixed to the driving member. With the first free end supported by the support protrusion, the engagement member may be engaged with the end portion of the support protrusion and the support member may be fixed to the driving member, in engagement with the second free end.

A pair of elastic members may be arranged symmetrically with respect to the hinge axis.

The portable terminal may further include a guide member inserted into the through hole on the one surface of the fixed member, a guide stopper protruding from an outer circumferential surface of the guide member, a reception groove formed on one surface of the rotation member, for accommodating a part of the guide member, and a pair of step surfaces formed outside the reception groove. As the rotation member rotates, one of the step surfaces may interfere with the guide stopper and stop the rotation of the rotation member. As the step surfaces interfere with the guide stopper, the rotation member may rotate up to 180°.

The portable terminal may further include a fixing protrusion formed on the one surface of the fixed member, and a fixing grove formed at the guide stopper. When the guide member is inserted into the through hole, the fixing protrusion may be engaged with the fixing groove, thereby fixing the guide stopper to the fixed member.

The portable terminal may further include a reciprocal member for making a linear reciprocal movement on the fixed member, a link member having one end rotatably engaged with the driving member and the other end rotatably engaged with one end of the reciprocal member, and a support screw engaged with the other end of the reciprocal member. When the elastic member is wound around an outer circumferential surface of the reciprocal member, with the one end of the elastic member supported by the other end of the reciprocal member and, the other end of the elastic member supported by the fixed member, the elastic member may provide an elastic force in a direction that makes the reciprocal member recede from the driving member.

The portable terminal may further include a link pin extended from the rotation member along a direction of the hinge axis, apart from the hinge axis. The link pin may be extended through the driving member and rotatably engaged with the one end of the link member.

The portable terminal may further include a first support shaft formed into a cylindrical shape at the rotation member and having at least one plane on an outer circumferential surface of the first support, a second support shaft formed at the driving member and inserted into the through hole, and a support hole formed at the second support shaft and engaged with the first support shaft.

The portable terminal may further include a link pin extended from an end portion of the first support shaft along a direction of the hinge axis, apart from the hinge axis. The link pin may be extended through the driving member and rotatably engaged with the one end of the link member.

The portable terminal may further include a guide portion formed at the fixed member, a guide hole penetrating through an end portion wall of the guide portion, and a connection portion formed at the one end of the reciprocal member. The other end of the link member may be rotatably engaged with the connection portion and the connection portion may make a linear reciprocal movement within the guide portion.

A part of the reciprocal member may be extended through the guide hole so as to be located outside the guide portion and the elastic member may be wound around an outer circumferential surface of the reciprocal member outside the guide portion. Thus the other end of the elastic member may be supported by an outer side wall of an end portion of the guide portion.

BRIEF DESCRIPTION OF THE DRAWINGS

The above features and advantages of certain exemplary embodiments of the present invention will be more apparent from the following detailed description taken in conjunction with the accompanying drawings, in which.

Throughout the drawings, the same drawing reference numerals may be understood to refer to the same elements, features and structures.

DETAILED DESCRIPTION OF THE INVENTION

The matters defined in the description, such as a detailed construction and elements, are provided to assist in a comprehensive understanding of exemplary embodiments of the invention. Accordingly, those of ordinary skill in the art will recognize that various changes and modifications of the embodiments described herein can be made without departing from the scope and spirit of the invention. For the purposes of simplicity, descriptions of well-known functions and constructions are omitted for clarity and conciseness.

Figure 1:
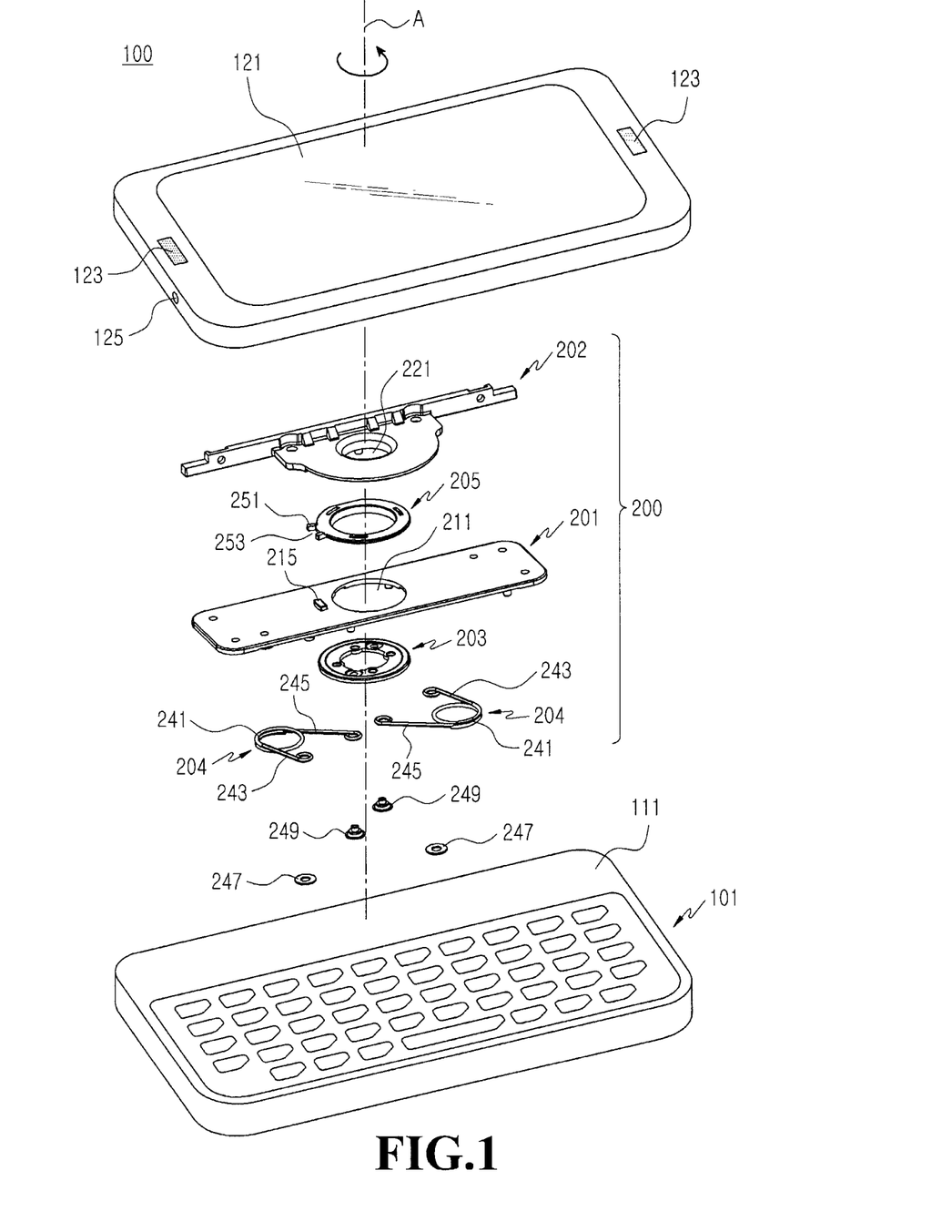
FIG. 1 is a perspective view of a portable terminal according to an exemplary embodiment of the present invention.
Figure 2:
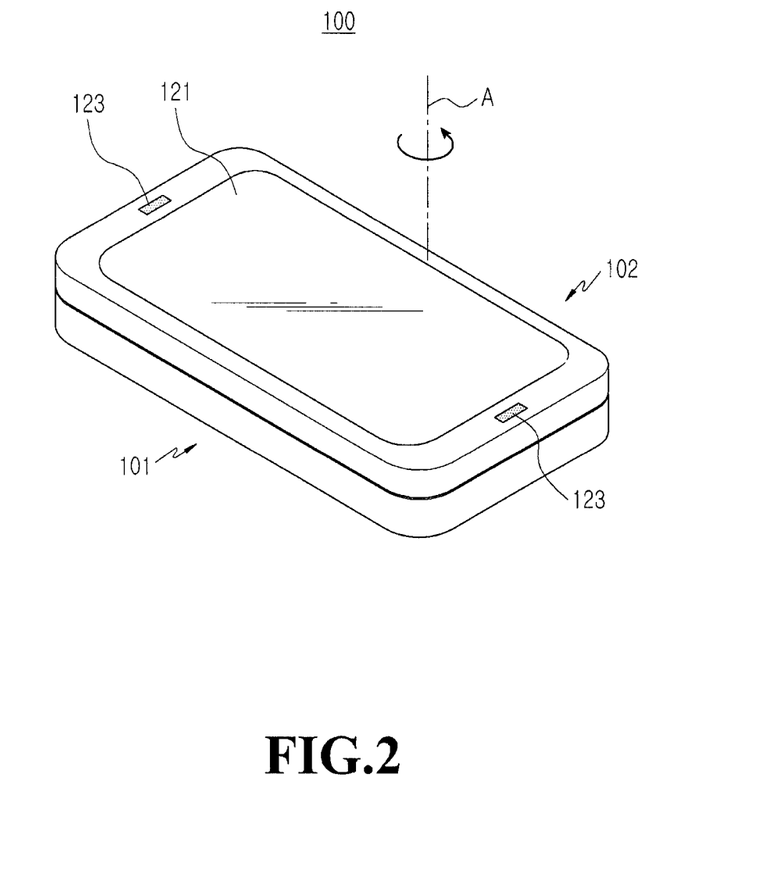
FIG. 2 is an assembled perspective view of the portable terminal illustrated in FIG. 1.

FIG. 1 is a perspective view of a portable terminal 100 according to an exemplary embodiment of the present invention and FIG. 2 is an assembled perspective view of the portable terminal 100 illustrated in FIG. 1.

Referring to FIGS. 1 and 2, the portable terminal 100 according to an exemplary embodiment of the present invention includes a first housing 101, a second housing 102, and a hinge device 200 for engaging the first housing 101 with the second housing 102 such that the second housing 102 may rotate while facing the first housing 101. The second housing 102 may rotate around a hinge axis A vertically extended from a surface of the first housing 101, opening the first housing 101 and then may be positioned at a side of the first housing 101 in parallel with the first housing 101. If a QWERTY keypad 111 is provided in the first housing 101, a user may write a long text mail or access an Internet homepage using the keypad 111. Irrespective of whether the first housing 101 is opened or closed, the user may enjoy a multimedia function, such as viewing a video or a broadcast program, by positioning a display 121 provided in the second housing 102 to be extended horizontally.

As stated above, the first housing 101 includes a QWERTY keypad 111 and the second housing 102 includes the display 121. In addition, the second housing 101 further may include speakers 123, at both side portions, for providing stereo sound when the multimedia function is used. When a microphone 125 is installed on a surface of an end portion of the second housing 102, (in one aspect, near to a side of the display 121), the user may conduct a voice call through the portable terminal 100 without the need for opening the first housing 101. When the display 121 is implemented as a touch screen, a touch keypad may be configured on the display 121. Thus the user may enter an input (such as a phone number of another party) for a voice call or write a short message without opening the first housing 101.

The present invention is intended to rotatably engage the pair of housings 101 and 102, facing each other in such a manner that their rotation can be convenient and stable and the housings 101 and 102 can be miniaturized. Many variations and modifications can be made to installation of the display 121, the keypad 111, the speakers 123, and the microphone 125 by those skilled in the art.

A detailed description will be made of the hinge device 200 with reference to FIGS. 3 and 4, which represent an inverted view of the assembly shown in FIG. 1.

Figure 3:
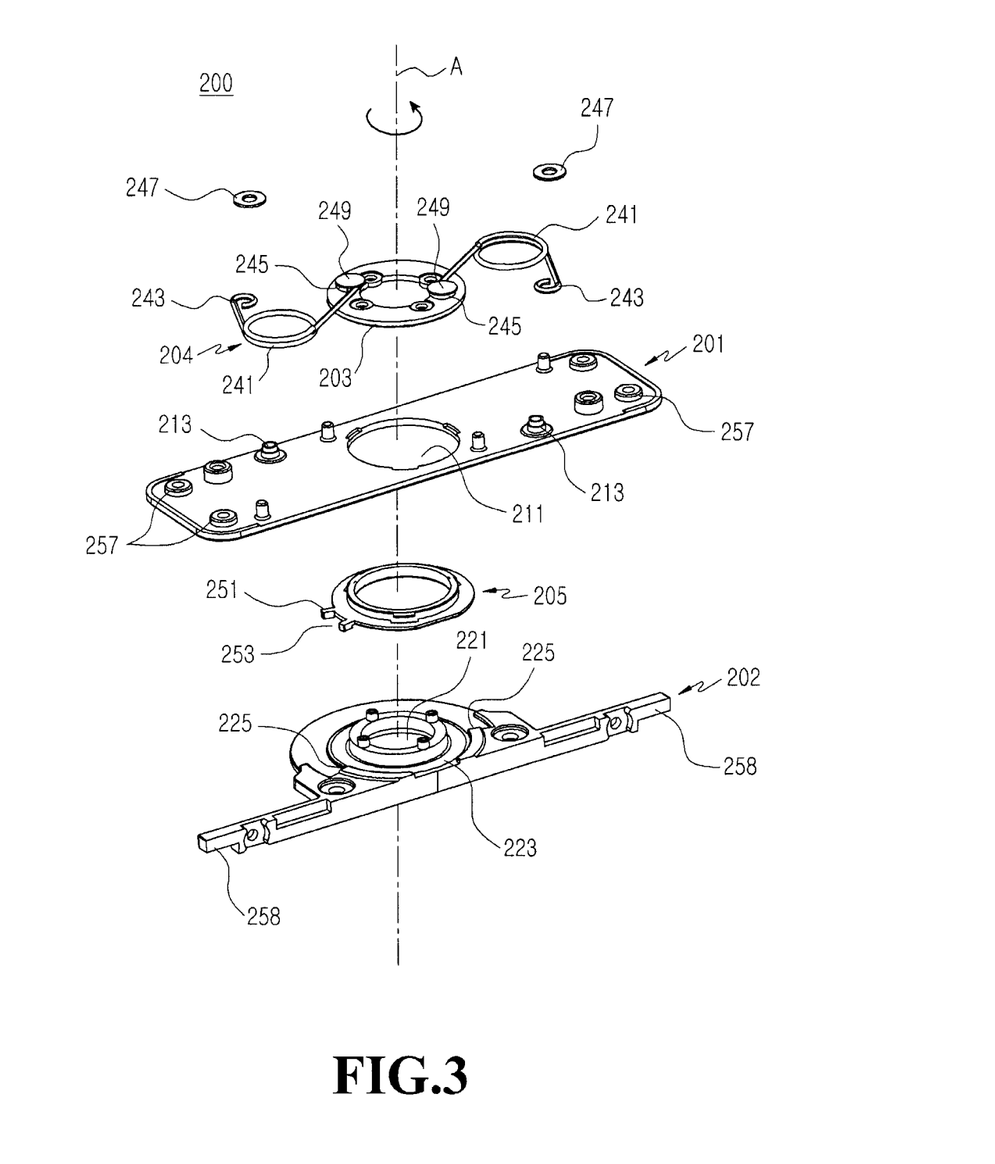
FIG. 3 is an exploded perspective view of a hinge device illustrated in FIG. 1.
Figure 4:
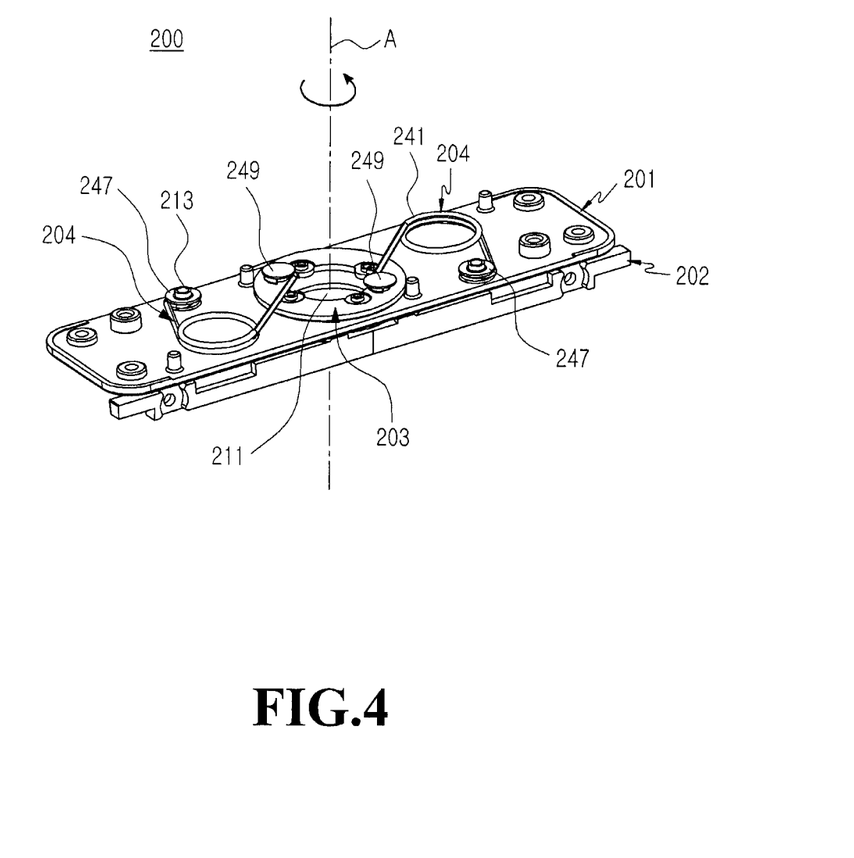
FIG. 4 is an assembled perspective view of the hinge device illustrated in FIG. 3.

Referring to FIGS. 3 and 4, the hinge device 200 includes a fixed member 201, a rotation member 202, a driving member 203, and an elastic member 204. The rotation member 202 is fixedly engaged with the driving member 203 through the fixed member 201, which is in between the two elements, such that the rotation member 202 and the driving member 203 may rotate with respect to the fixed member 201. The elastic member 204 provides a driving force in a rotation direction (a first direction) or a direction reverse to the rotation direction (a second direction opposite the first direction) according to a position to which the rotation member 202 and the driving member 203 are rotated.

The fixed member 201, which is a plate-shaped, is fixed on the first housing 101 and includes a through hole 211 penetrating through both surfaces of the fixed member 201. The through hole 211 is circular, formed with its center on the hinge axis A. The fixed member 201 is provided with a fixing protrusion 215 (see FIG. 1) on one surface of the fixed member and with a pair of support protrusions 213 (FIG. 3) on the other surface of the fixed member. Preferably, the support protrusions 213 are arranged symmetrically with respect to the hinge axis A. In FIG. 3, a plurality of bosses 257 are formed on the other surface of the fixed member 201 in order to fix the fixed member 201 onto the first housing 101.

A guide member 205 may be mounted on the one surface of the fixed member 201. One part of the guide member 205 is inserted into the through hole 211, while the other part of the guide member 205 is mounted on the one surface of the fixed member 201. A guide stopper 251, having a fixing groove 253 formed at an end portion, is extended from an outer circumferential surface of the guide member 205. When the guide member 205 is installed on the fixed member 201, the guide stopper 251 is brought into close contact with the one surface of the fixed member 201, while the fixing protrusion 215 is engaged with the fixing groove 253. Consequently, the guide member 205 is installed, in a fixed, non-rotatably attachment, on the fixed member 201.

The rotation member 202 is fixed to the second housing 202, rotatably on the one surface of the fixed member 201. As the driving member 203 is rotatably engaged in the through hole 211 on the other surface of the fixed member 201, while being fixed to the rotation member 202, the rotation member 202 and the driving member 203 may rotate stably without deviating from the fixed member 201.

A reception groove 223 is formed along a circumferential edge on one surface of the rotation member 202 facing the one surface of the fixed member 201, and a pair of step surfaces 225 is formed apart from each other outside the reception groove 223. When the rotation member 202 is engaged with the fixed member 201, the other part of the guide member 205, that is, the part of the guide member 205 on the one surface of the fixed member, is received in the reception groove 223 and the guide stopper 251 protrudes from the reception groove 223. If the rotation member 202 rotates around the hinge axis A with respect to the fixed member 201, the guide stopper 251 moves along the circumferential edge outside the reception groove 223 and stops the rotation of the rotation member 202 at a position where one of the step surfaces 225 interferes with the guide stopper 251. That is, the rotation range of the rotation member 202 is limited by the guide stopper 251 and the step surfaces 225. In the exemplary embodiment of the present invention, up to 180 degrees is available for the rotation of the rotation member 202.

Engagement arms 258, receding from each other, are extended from an outer circumferential edge of the rotation member 202 so as to tighten the engagement with the second housing 102. In addition, the rotation member 202 is further provided with a wiring hole 221 that is concentrically positioned within the through hole 211. A flexible printed circuit (not shown) is connected to circuits of the first and second housings 101 and 102 through the wiring hole 221.

The driving member 203 is inserted into the through hole 211 on the other surface of the fixed member 201, while being fixed to the rotation member 202. The driving member 203 has a larger diameter than the through hole 211, and an edge of the through hole 211 partially faces the other surface of the driving member 203. To fix the driving member 203 to the rotation member 202, means to engage with a screw, such as a boss, an engagement hole, etc. is provided in each of the driving member 203 and the rotation member 202.

The elastic member 204 provides an elastic force that makes both ends of the elastic member 204 recede from each other. Typically, a compressed coil spring 241 is used for the elastic member 204. In the exemplary embodiment of the present invention, the elastic member 204 is configured using a torsion spring. Specifically, the elastic member 204 is provided with the coil 241 and a pair of free ends 243 and 245 extended from the coil 241. The elastic members 204 are positioned on opposite sides of the through hole 211 such that a corresponding free end 243 on each coil 241 recedes from each other. As described before, the elastic member 204 provides an elastic force to make both ends recede from each other. That is, the elastic force makes corresponding ones of free ends 243 and 245 of the torsion spring recede from each other.

The first free end 243 of the elastic member 204 is engaged with, and thus supported by, a support protrusion 213 formed on the fixed member 201. An end portion of the first free end 243 is engaged with the support protrusion 213, surrounding the outer circumferential surface of the support protrusion 213. With the end portion of the first free end 243 engaged with the support protrusion 213, an engagement member 247 is engaged with an end portion of the support protrusion 213. Therefore, the first free end 243 is kept engaged with the support protrusion 213 without deviating from the support protrusion 213.

The second free end 245 of the elastic member 204 is supported by the driving member 203. Specifically, a support member 249 is installed to the driving member 203 by a rivet. With the second free end 245 engaged with the support member 249, surrounding an outer circumferential edge of the support member 249, the support member 249 is fixed to the driving member 203.

Thus, the elastic member 204 is installed with one end thereof supported on the fixed member 201 and the other end thereof supported on the driving member 203. Like the support protrusions 213, a pair of elastic members 204 may be arranged symmetrically with respect to the hinge axis A (as shown). However, in alternate embodiments, a single elastic member 204 may be used and the elastic member 204 may be configured by combining springs other than torsion springs.

That is, it is not always necessary to arrange the elastic members 204 symmetrically with respect to the hinge axis A.

Figure 5:
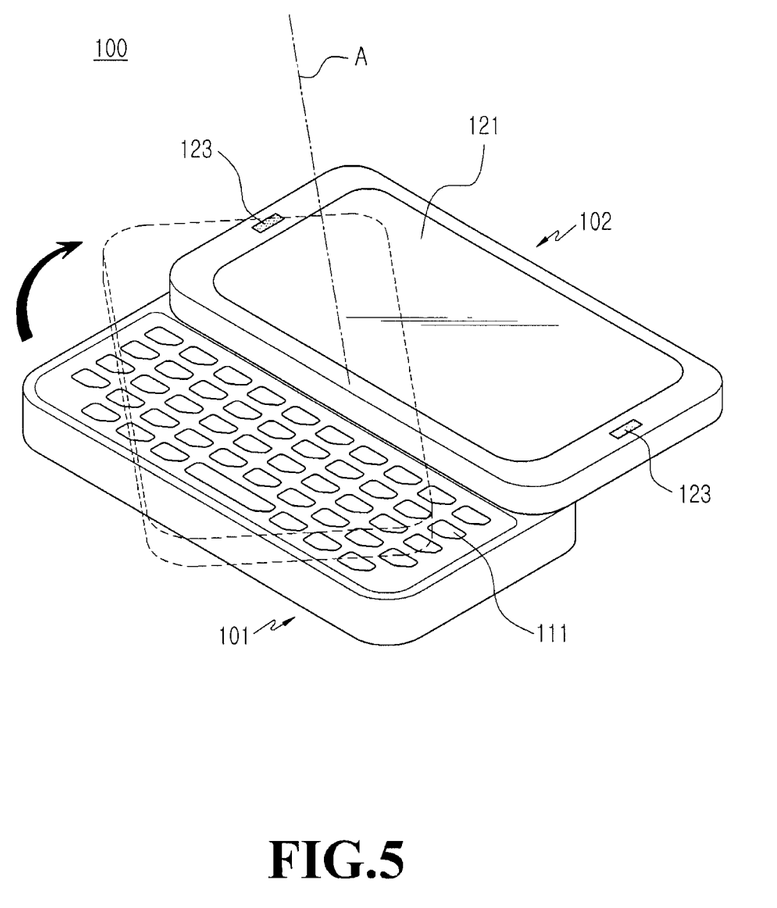
FIG. 5 is a perspective view of the portable terminal illustrated in FIG. 2, referred to for describing an opening and closing operation.
Figure 6A:
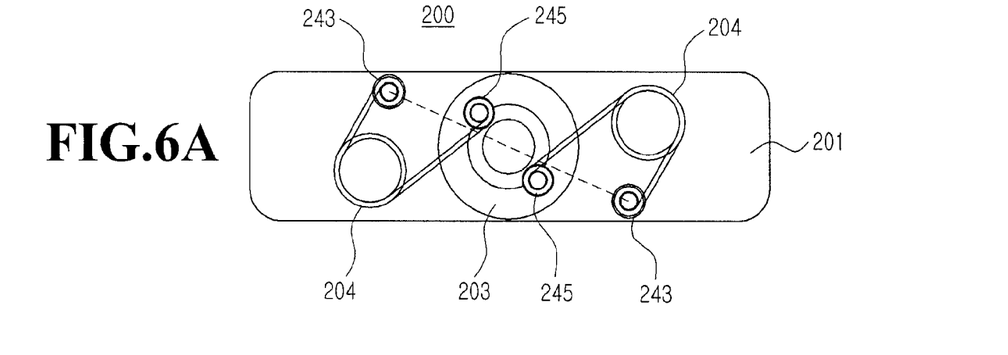
FIGS. 6A, 6B and 6C are perspective views of the hinge device, referred to for describing an operation of the hinge device when the portable terminal illustrated in FIG. 2 is opened and closed.
Figure 6B:
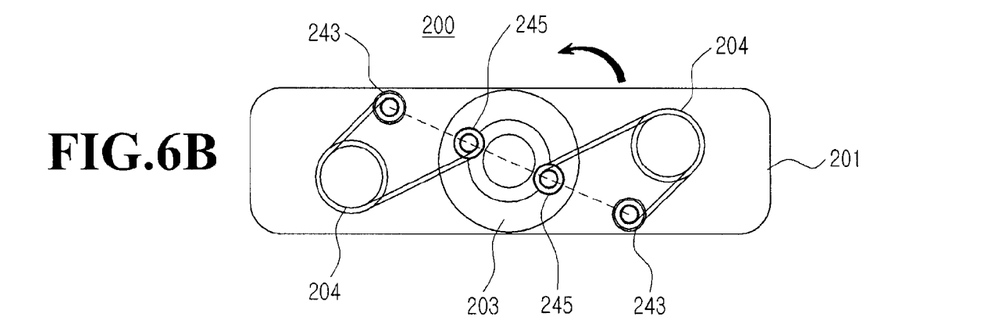
Figure 6C:
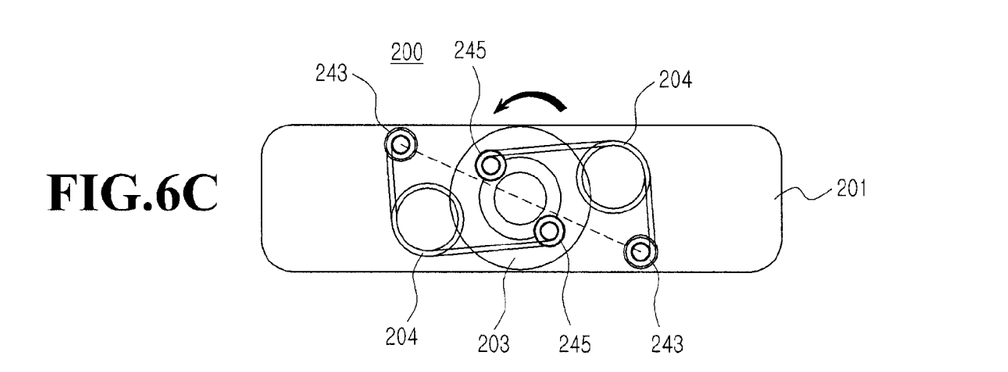

FIG. 5 is a perspective view of the portable terminal 100, referred to for describing an operation for opening the first housing 101, particularly the keypad 111 by rotating the second housing 102, and FIGS. 6A, 6B and 6C sequentially illustrate an operation of the hinge device 200 in the course of rotating the first housing 101 to expose the keypad 111. Because the elastic member 204 provides an elastic force in a direction that makes both ends of the elastic member 204 recede from each other, those skilled in the art would recognize that a cumulative elastic force of the elastic member 204 is highest when the first and second free ends 243 and 245 are nearest to each other.

When the second housing 102 covers the first housing 101, the hinge device 200 is in the state as illustrated in FIG. 6A. As the elastic member 204 exerts an elastic force in the direction that makes both ends of the elastic member 204 recede from each other in the state of FIG. 6A, the driving member 203 tends to rotate clockwise. A driving force that is to rotate the driving member 203 clockwise in FIG. 6A is exerted as a force that rotates the second housing 102 illustrated in FIG. 5 counterclockwise (direction of illustrated arrow).

The guide stopper 251 is interfered by one of the step surfaces 225 and thus the driving member 203 does not rotate clockwise any further in FIG. 6A. Therefore, the second housing 102 does not rotate counterclockwise any further and thus is maintained in position covering the first housing 101 as shown in FIG. 5. The elastic force of the elastic member 204 is exerted as a force that holds the second housing 102.

FIG. 6B illustrates the first and second free ends 243 and 245 at a position where they are nearest to each other, as the driving member 203 rotates counterclockwise. At the position where the free ends 243 and 245 are nearest to each other, the elastic member 204 accumulates the highest elastic force, as stated before. When the driving member 203 rotates clockwise or counterclockwise in the state where the free ends 243 and 245 are nearest to each other, the elastic force of the elastic member 204 is exerted in a direction for rotating the driving member 203. That is, the driving member 203 is rotated by the elastic force of the elastic member 204.

If the driving member 203 further rotates counterclockwise as represented by the arrow shown in FIG. 6B, the elastic force of the elastic member 204 rotates the driving member 203 counterclockwise. With this driving force, the driving member 203 rotates until the guide stopper 251 (not shown) is interfered by the other one of the step surfaces 225.

FIG. 6C illustrates the hinge device 200 in which the guide stopper 251 is interfered by the other step surface 225 (see FIG. 3). Herein, the second housing 102 resides at a position where it fully opens the first housing 101, and thus exposes the keypad 111 (see FIG. 5). Since the elastic member 204 still accumulates the elastic force applied in the direction that makes both ends of the elastic member 204 recede from each other, the accumulated elastic force is exerted as a driving force that tends to rotate the second housing 102 of FIG. 5 clockwise (arrow direction). Because the guide stopper 251 is already interfered by the other step surface 225, the second housing 102 may be stationary at the position where it fully exposes the keypad 111.

Consequently, unless an external force is applied to the first housing 101 or second housing 102, the second housing 102 stays at one of the positions where it covers the first housing 101 (either partially or fully). In one case, the position of second housing 102 exposes the keypad 111 through a rotation of 180 degrees. This is attributed to the driving force of the elastic member 204, as described before.

When the user intends to expose the keypad 111, the user may rotate the second housing 102 at an angle less than 180 degrees to which the second housing 102 can rotate. Then the second housing 102 rotates as much as the remaining angle by the elastic force of the elastic member 204, thus exposing the keypad 111. Similarly, when the user intends to close the keypad 111, the user may rotate the second housing 102 only to an angle at which the elastic force of the elastic member 204 can rotate the driving member 203 clockwise into a position as illustrated in FIG. 6A. Then the second housing 102 rotates for the remaining range by the elastic force of the elastic member 204, thereby hiding the keypad 111.

As described above, since the portable terminal 100 according to the exemplary embodiment of the present invention provides a driving force using the elastic member 204 of a torsion spring structure as well as the plate-shaped fixed member 201, the rotation member 202, and the driving member 203, the thickness of the hinge device 200 that performs a swing operation can be reduced and a semi-automatic opening and closing operation can be realized by the elastic force of the elastic member 204.

FIGS. 7 to 10 illustrate a hinge device 300 for a portable terminal according to another exemplary embodiment of the present invention.

Referring to FIGS. 7 to 10, the hinge device 300 according to another exemplary embodiment of the present invention includes a fixed member 301, a rotation member 302, a driving member 303, and an elastic member 304. The hinge device 300 is configured so as to convert the elastic force of the elastic member 304 to a rotation force by a crank structure. The elastic member 304 is a compressed coil spring that provides an elastic force in a direction that makes both ends of the elastic member 304 recede from each other. An elastic force that the elastic member 304 exerts linearly is converted to a driving force that rotates the driving member 303, the rotation member 302, and eventually the second housing 102 by the crank structure according to this exemplary embodiment.

Similar to the afore-described exemplary embodiment, the fixed member 301 is fixed to the first housing 101 and the rotation member 302 is fixed to the second housing 102. In this context, this exemplary embodiment will be described referring to the afore-described exemplary embodiment, without illustrating the first and second housings 101 and 102 in detail.

Figure 7:
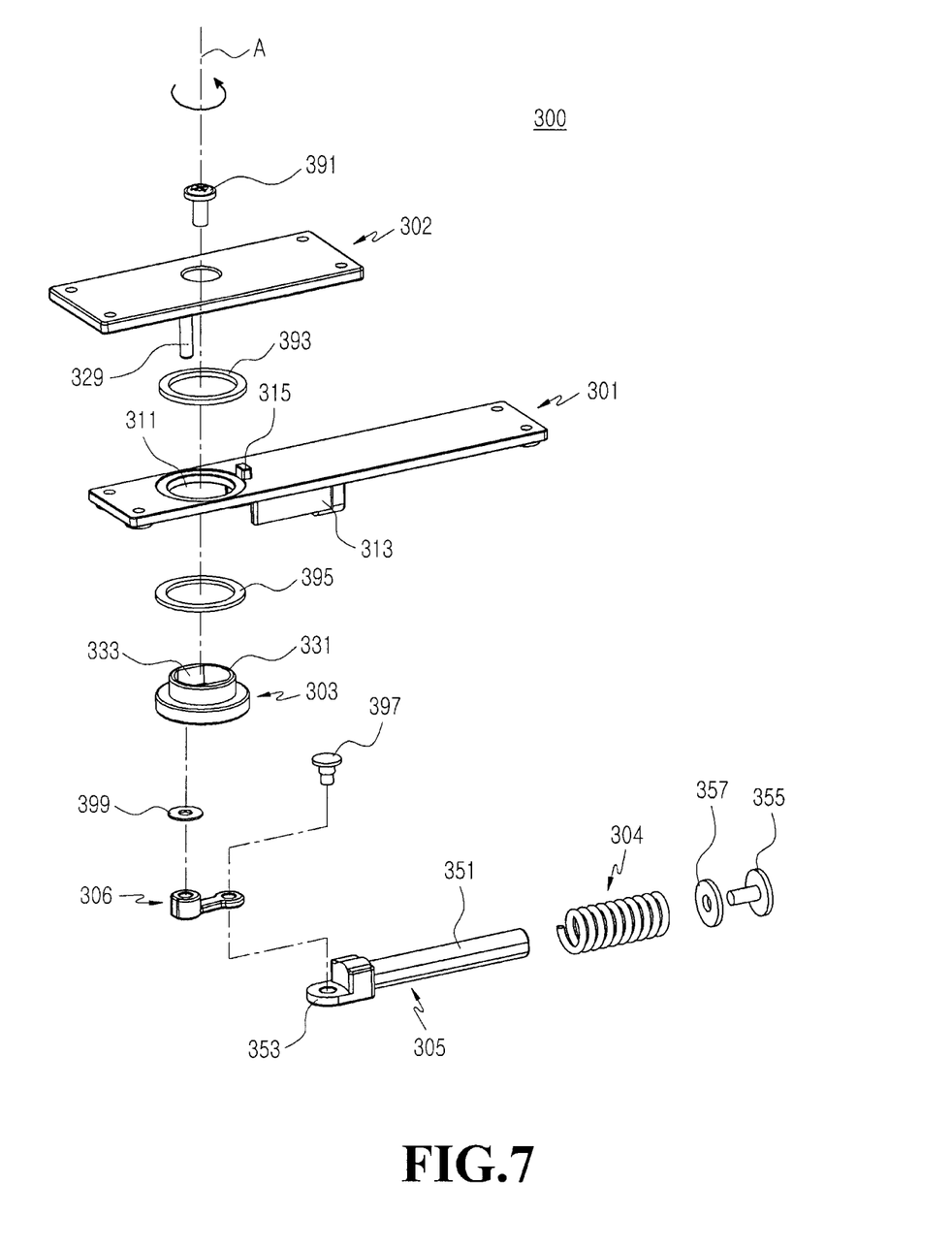
FIG. 7 is an exploded perspective view of a hinge device in a portable terminal according to another exemplary embodiment of the present invention.

The fixed member 301 is provided with a through hole 311 that penetrates both surfaces of the fixed member 301. The fixed member 301 further includes a guide stopper 315 on one surface thereof and a guide portion 313 (see FIG. 8) on the other surface thereof. The guide stopper 315 is received in a reception groove 323 (see FIG. 8) formed in the rotation member 302. Also, the guide stopper 315 is interfered by walls 325 of both end portions of the reception groove 323, thus limiting the rotation range of the rotation member 302 to 180°. The guide portion 313 serves as a housing for containing the crank structure. Herein, an end portion of the guide portion 313 near to the through hole 311 is open and the other end portion of the guide portion 313 has a wall in which a guide hole 317 is formed.

Figure 8:
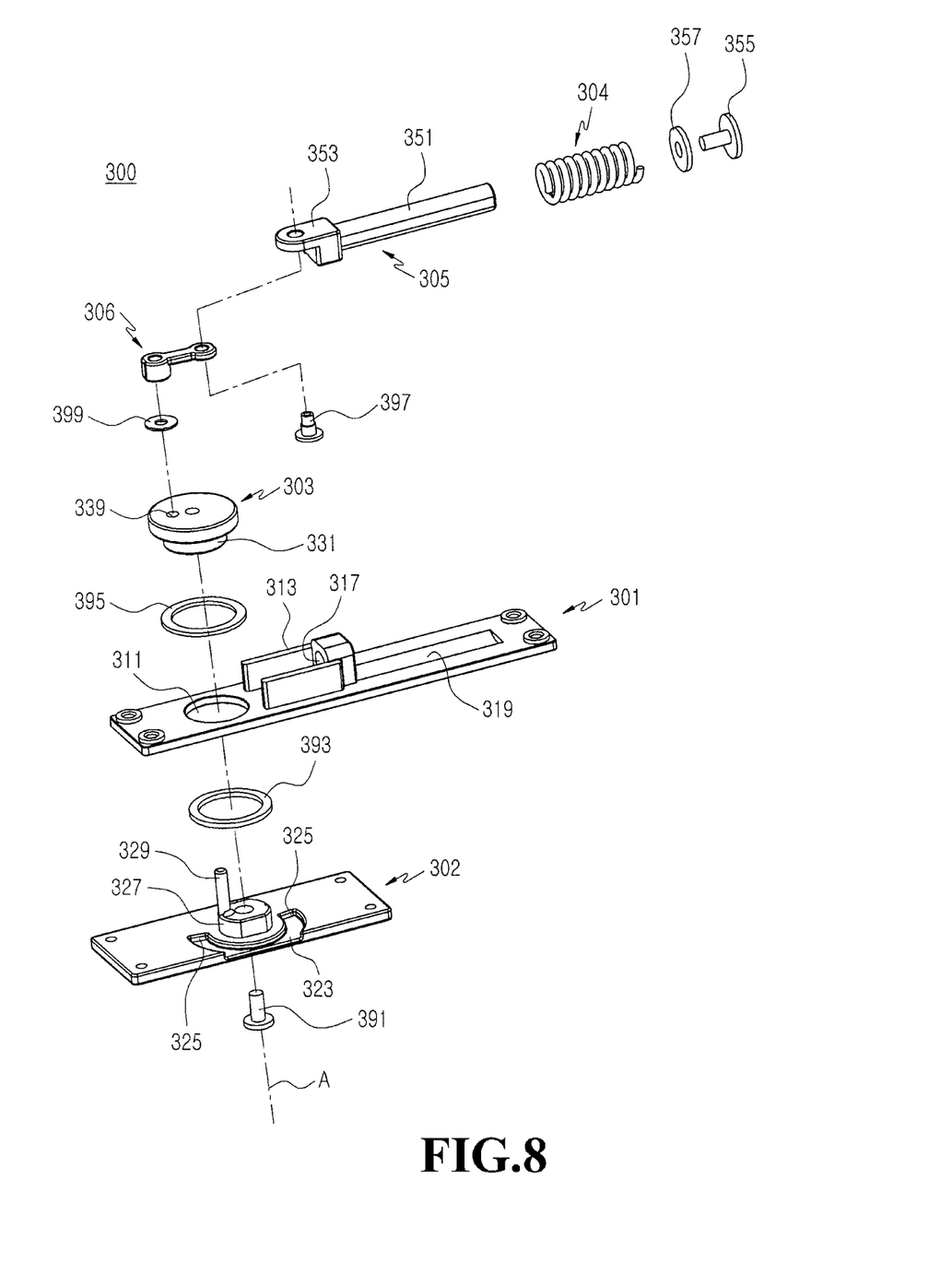
FIG. 8 is an exploded perspective view of the exemplary hinge device illustrated in FIG. 7.
Figure 9:
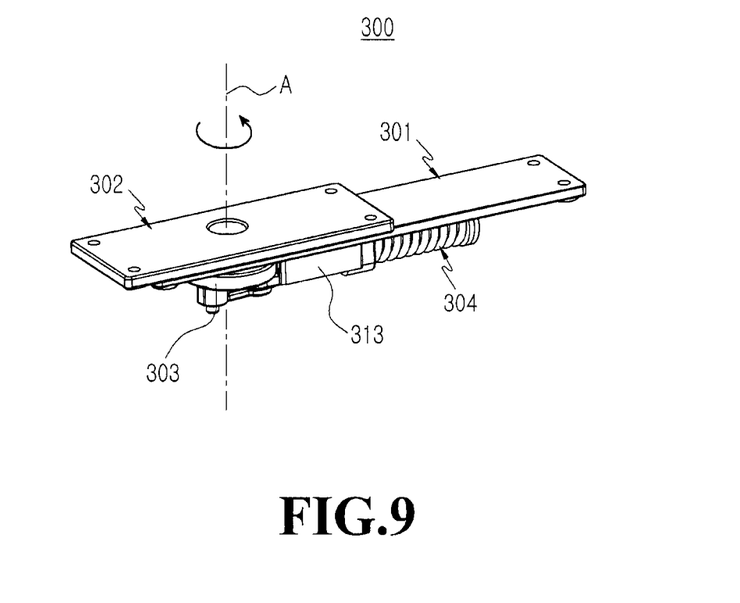
FIG. 9 is an assembled perspective view of the exemplary hinge device illustrated in FIG. 7.
Figure 10:
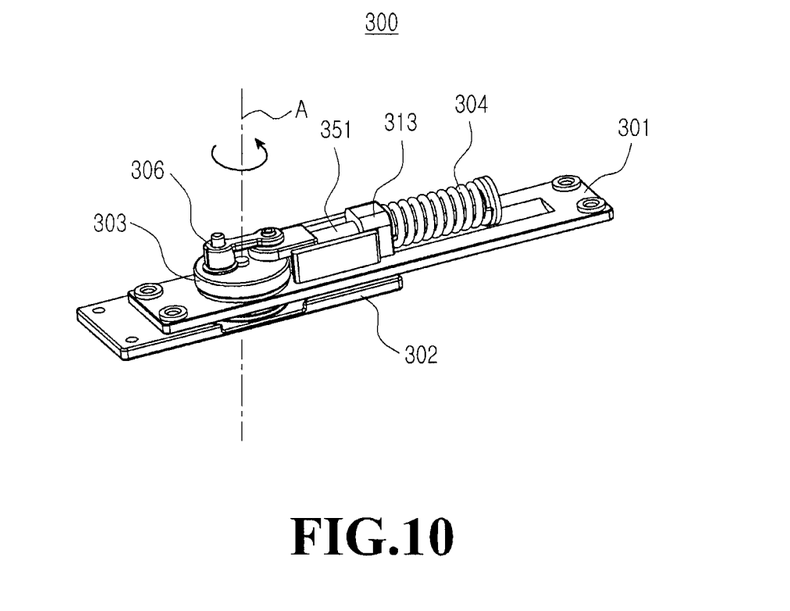
FIG. 10 is an assembled perspective view of the exemplary hinge device illustrated in FIG. 9.

A recess 319 is extended in a line from the guide hole 317 of the guide portion 313 on the other surface of the fixed member 301, to provide a space for installing the elastic member 304. If the elastic member 304 can be made small enough, there is no need for forming the recess 319.

The rotation member 302 is rotatably engaged with the fixed member 301, facing the one surface of the fixed member 301. The rotation member 302 has a cylindrical first support shaft 327 and the reception groove 323 around the first support shaft 327 on one surface of the rotation member 302. Part of an outer circumferential edge of the first support shaft 327 is planar. The reception groove 323 is extended along a circumferential direction, around the hinge axis A. A link pin 329 is extended from the first support shaft 327 along the direction of the hinge axis A, apart from the hinge axis A.

With a part of the driving member 303 inserted into the through hole 311, the driving member 303 is engaged with the other surface of the fixed member 301, while being fixed to the rotation member 302. The driving member 303 is provided with a second support shaft 331 corresponding to the first support shaft 327, and the second support shaft 331 has a support hole 333 (See FIG. 7) for accommodating the first support shaft 327. The support hole 333 also has a plane on its wall so that the first and second shafts 327 and 331 are engaged non-rotatably.

When the first and second support shafts 327 and 331 are engaged by tightening a screw 391, with the second support shaft 331 fit into the first support shaft 327, the driving member 303 is fixed to the rotation member 302. Thus the driving member 303 and the rotation member 302 can rotate without deviating from the fixed member 301. The rotation member 302 and the driving member 303 may rotate smoothly with respect to the fixed member 301 by interposing lubricating members 393 and 395 between them, such as washers formed of lubricating and friction-proof materials such as Poly-OxyMethylene (POM).

The crank structure for converting a linear movement to a rotation may include a reciprocal member 305 and a link member 306. The reciprocal member 305 is installed at the guide portion 313. One portion of the reciprocal member 305 is formed into a movement portion 351 that makes a linear reciprocal movement. The movement portion 151 is extended through the guide hole 317. The other portion of the reciprocal member 305 is a connection portion 353 at an end of the movement portion 351. The connection portion 353 is interfered by an inner wall of the guide portion 313 and the driving member 303 and thus its movement range is limited. Consequently, the linear movement range of the reciprocal member 305 is limited.

With the movement portion 351 inserted into the guide hole 317, the elastic member 304 is wound around the reciprocal member 305, particularly an outer circumferential edge of the movement portion 351 outside the guide portion 313. With the elastic member 304 wound around the outer circumferential edge of the movement portion 351, the other end of the reciprocal member 305 is engaged with a support screw 355. Since the support screw 355 is engaged with the reciprocal member 305 through a washer 357 having a larger diameter than the elastic member 304, it engages the washer 357 with the other end of the reciprocal member 305. Therefore, the elastic member 304, of which one end is supported on the fixed member 301, particularly an outer side surface of the guide portion 313 and of which the other end is supported by the washer 357, provides an elastic force in a direction that makes both ends thereof recede from each other. Thus, the ends proceed in a direction that makes the reciprocal member 305 recede from the driving member 303. Accordingly, so far as an external force is not applied, the connection portion 353 may be kept in close contact with the inner side wall of the guide portion 313.

One end of the link member 306 is rotatably engaged with the driving member 303 and the other end of the link member 306 is rotatably engaged with the connection portion 353 of the reciprocal member 305. The link pin 329 extended from the rotation member 302, specifically from the first support shaft 327 is engaged with the link member 306 through the driving member 303. A link hole 339 is formed in the driving member 303, to allow the link pin 329 to extend therethrough. The link hole 339 is positioned apart from the hinge axis A.

Another lubricating member 399 formed of a material such as POM may be interposed between the link member 306 and the driving member 303, and the other end of the link member 306 is rotatably engaged with the connection portion 353 by a rotation pin 397.

With reference to FIGS. 11A to 11D, an operation of the hinge device 300 will be described in great detail.

Figure 11A:
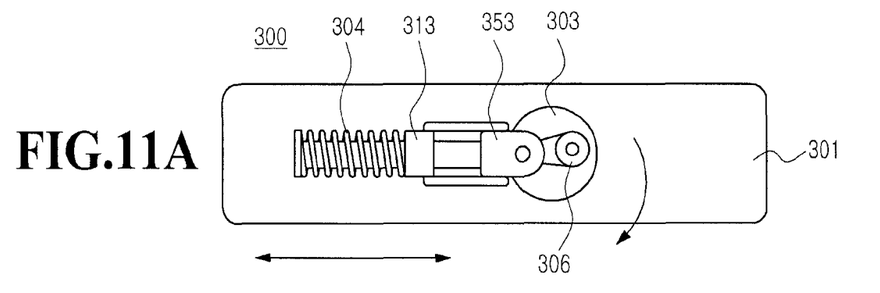
FIGS. 11A to 11D illustrate an operation of the hinge device illustrated in FIG. 7.

FIG. 11A illustrates the hinge device 300 when the second housing 102 covers the first housing 101. In this case, when the first housing 101 is covered with the second housing 102, the elastic force of the elastic member 304 is exerted to move the reciprocal member 305 to the left. Therefore, the driving member 303 tends to rotate counterclockwise in FIG. 11A. As the guide stopper 315 is interfered by one of the end portion walls 325 of the reception groove 323, the driving member 303 does not rotate further counterclockwise. As a result, despite the elastic force of the elastic member 304, the second housing 102 stays stationary as the guide stopper 315 is interfered by the end portion wall 325 of the reception groove 323.

Figure 11B:
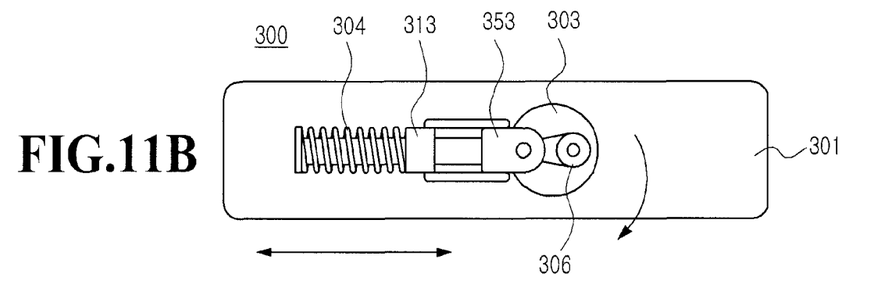

When the user rotates the second housing 102 to open the keypad 111, the driving member 303 gradually rotates clockwise. FIG. 11B illustrates a state where as the driving member 303 rotates, and, thus, both ends of the elastic member 304 are nearest to each other. In this state, if the driving member 303 rotates in one direction, the elastic force of the elastic member 304 is exerted as a driving force that rotates the driving member 303 in the corresponding direction.

That is, if the keypad 111 is opened by rotating the second housing 102 in the state illustrated in FIG. 11A, the elastic force of the elastic member 304 serves as a driving force that opens the second housing 102 after the moment when the state of FIG. 11B is achieved.

Figure 11C:
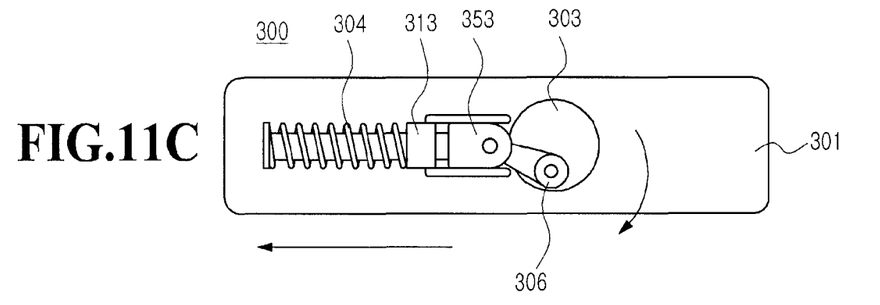
Figure 11D:
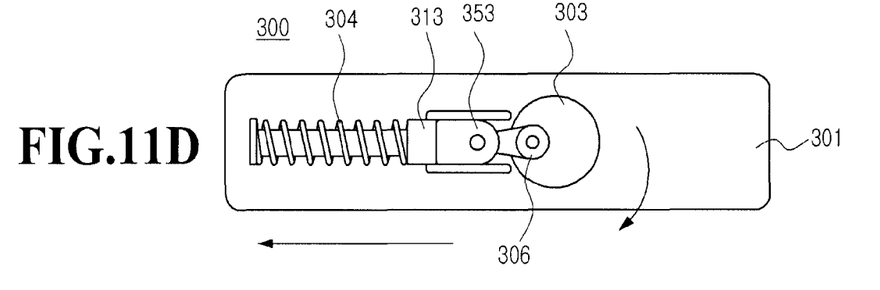

While the keypad 111 is being opened by the elastic force of the elastic member 304, the hinge device 300 operates from the state of FIG. 11C to the state of FIG. 11D. In the state of FIG. 11D, the cumulative elastic force of the elastic member 304 is smallest.

FIG. 11D illustrates a state where the driving member 303 rotates more than 180° relative to the state of FIG. 11A. Actually, the second housing 102 rotates by 180° from the position where the second housing 102 covers the first housing 101. When the keypad 111 is opened and the second housing 102 stops, the driving member 303 does not rotate to the state of FIG. 11D. Hence, when the keypad 111 is fully opened, the elastic force of the elastic member 304 still serves as a driving force that rotates the driving member 303 clockwise and the guide stopper 315 is interfered by the other end portion wall 325 of the reception groove 323. Thus the driving member 303 does not rotate clockwise any longer. Therefore, as the keypad 111 is fully exposed, the second housing 102 stays stationary stably.

It can be concluded that with no external force applied to the hinge device 200 or 300, the stationary state of the second housing 102, that is, the covered or fully exposed state of the keypad 111 is maintained by use of the elastic force of the elastic member 204 or 304 and the guide stopper 251 or 351. When the user rotates the second housing 102 in the stationary state, the elastic force of the elastic member 204 or 304 gradually increases for a certain period of time, that is, until both ends of the elastic member 204 or 304 are nearest to each other. Then the second housing 102 is rotated by the elastic force of the elastic member 204 or 304 after the moment when both ends of the elastic member 204 or 304 are nearest to each other.

As is apparent from the above description, the exemplary embodiments of the present invention, the swing-type portable terminal includes a hinge device that is configured by combining a driving member and a rotation member on both surfaces of a fixed member. Therefore, the rotation member can be rotated stably with respect to the fixed member. Also, a driving force is provided to rotate the rotation member at a certain angle by the elastic force of an elastic member, thereby making opening and closing of the swing-type portable terminal convenient.

Without an additional engagement means such as a hinge shaft and an E-ring, the driving member and the rotation member can be fixed to each other, face to face by use of a screw. Accordingly, the driving member and the rotation member can be fabricated as plates, thus contributing to a decrease in the thickness of the hinge device.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A portable terminal with a first housing and a second housing, comprising:
   a fixed member having a through hole and fixed to one surface of the first housing, the through hole penetrating both surfaces of the fixed member;
   a rotation member fixed to one surface of the second housing, the one surface facing one surface of the fixed member;
   a driving member rotatably engaged with the through hole on the other surface of the fixed member and fixed to the rotation member; and
   an elastic member having one end supported by the fixed member and the other end supported by the driving member, for providing a driving force to rotate the driving member,
   wherein the second housing covers the first housing or moves to a position where the second housing is parallel with the first housing by rotating along with the rotation member and the driving member around a hinge axis extended vertically with respect to the one surface of the first housing by the driving force of the elastic member.

2. The portable terminal of claim 1, wherein the elastic member is a torsion spring having a coil including first and second free ends extended from the coil to recede from each other, wherein the torsion spring provides the force in a direction that makes end portions of the free ends recede from each other.

3. The portable terminal of claim 2, further comprising:
   a support protrusion formed at the fixed member;
   an engagement member engaged with an end portion of the support protrusion; and
   a support member fixed to the driving member,
   wherein with the first free end supported by the support protrusion, and the engagement member is engaged with the end portion of the support protrusion, and the support member is fixed to the driving member, in engagement with the second free end.

4. The portable terminal of claim 2, wherein a pair of elastic members are arranged symmetrically with respect to the hinge axis.

5. The portable terminal of claim 2, further comprising:
   a guide member inserted into the through hole on the one surface of the fixed member;
   a guide stopper protruding from an outer circumferential edge of the guide member;
   a reception groove formed on one surface of the rotation member, for accommodating a part of the guide member; and
   a pair of step surfaces formed outside the reception groove,
   wherein as the rotation member rotates, one of the step surfaces interferes with the guide stopper and stops the rotation of the rotation member.

6. The portable terminal of claim 5, wherein the rotation member 20 rotates up to 180°, as the step surfaces interfere with the guide stopper.

7. The portable terminal of claim 5, further comprising:
   a fixing protrusion formed on the one surface of the fixed member; and
   a fixing grove formed at the guide stopper,
   wherein when the guide member is inserted into the through hole, the fixing protrusion is engaged with the fixing groove, thereby fixing the guide stopper to the fixed member.

8. The portable terminal of claim 2, wherein when the driving member rotates, the free ends approach each other and an elastic force accumulates in the elastic member, and after the free ends move to points where the free ends are nearest to each other, the driving force of the elastic member is exerted to rotate the driving member.

9. The portable terminal of claim 1, further comprising:
   a reciprocal member for making a linear reciprocal movement on the fixed member;
   a link member having one end rotatably engaged with the driving member and the other end rotatably engaged with one end of the reciprocal member; and
   a support screw engaged with the other end of the reciprocal member,
   wherein when the elastic member is wound around an outer circumferential surface of the reciprocal member, with the one end of the elastic member supported by the other end of the reciprocal member and, the other end of the elastic member supported by the fixed member, the elastic member provides an driving force in a direction that makes the reciprocal member recede from the driving member.

10. The portable terminal of claim 9, further comprising a link pin extended from the rotation member along a direction of the hinge axis, apart from the hinge axis,
    wherein the link pin is extended through the driving member and rotatably engaged with the one end of the link member.

11. The portable terminal of claim 9, further comprising:
    a first support shaft formed into a cylindrical shape at the rotation member and having at least one plane on an outer circumferential edge of the first support;
    a second support shaft formed at the driving member and inserted into the through hole; and
    a support hole formed at the second support shaft and engaged with the first support shaft.

12. The portable terminal of claim 11, further comprising a link pin extended from an end portion of the first support shaft along a direction of the hinge axis, apart from the hinge axis,
    wherein the link pin is extended through the driving member and rotatably engaged with the one end of the link member.

13. The portable terminal of claim 9, further comprising:
    a guide portion formed at the fixed member;

a guide hole penetrating through an end portion wall of the guide portion; and a connection portion formed at the one end of the reciprocal member, wherein the other end of the link member is rotatably engaged with the connection portion and the connection portion makes a linear reciprocal movement within the guide portion.

14. The portable terminal of claim 13, wherein a part of the reciprocal member is extended through the guide hole so as to be located outside the guide portion and the elastic member is wound around an outer circumferential edge of the reciprocal member outside the guide portion.

15. The portable terminal of claim 13, wherein the other end of the elastic member is supported by an outer side wall of an end portion of the guide portion.

* * * * *